(12) United States Patent
Natanzon et al.

(10) Patent No.: US 8,421,761 B2
(45) Date of Patent: Apr. 16, 2013

(54) IMAGING MULTI-MODALITY TOUCH PAD INTERFACE SYSTEMS, METHODS, ARTICLES OF MANUFACTURE, AND APPARATUS

(75) Inventors: Alexander Natanzon, Upper Saddle River, NJ (US); Medhi Venon, Whitefish Bay, WI (US); Shai Dekel, Ramat-Hasharon (IL); Christopher Janicki, Sleepy Hollow, IL (US)

(73) Assignee: General Electric Company, Schenectady, NY (US)

( * ) Notice: Subject to any disclaimer, the term of this patent is extended or adjusted under 35 U.S.C. 154(b) by 834 days.

(21) Appl. No.: 12/547,954

(22) Filed: Aug. 26, 2009

(65) Prior Publication Data

US 2011/0050587 A1 Mar. 3, 2011

(51) Int. Cl.
*G06F 3/041* (2006.01)
(52) U.S. Cl.
USPC .......................................... 345/173; 345/156
(58) Field of Classification Search ........... 345/173–179
See application file for complete search history.

(56) References Cited

U.S. PATENT DOCUMENTS

| 5,157,384 | A | * | 10/1992 | Greanias et al. ............... 345/156 |
| 5,317,140 | A | * | 5/1994 | Dunthorn ....................... 250/221 |
| 6,104,158 | A | | 8/2000 | Jacobus et al. |
| 6,967,642 | B2 | | 11/2005 | SanGiovanni |
| 7,199,790 | B2 | | 4/2007 | Rosenberg et al. |
| 7,215,321 | B2 | | 5/2007 | SanGiovanni |
| 7,460,105 | B2 | | 12/2008 | Rosenberg et al. |
| 7,489,309 | B2 | | 2/2009 | Levin et al. |
| 2003/0193481 | A1 | * | 10/2003 | Sokolsky ...................... 345/173 |
| 2004/0207601 | A1 | | 10/2004 | SanGiovanni |
| 2006/0181515 | A1 | | 8/2006 | Fletcher et al. |
| 2006/0256090 | A1 | * | 11/2006 | Huppi ........................... 345/173 |
| 2007/0152975 | A1 | | 7/2007 | Ogihara et al. |
| 2008/0211779 | A1 | | 9/2008 | Pryor |

FOREIGN PATENT DOCUMENTS

GB 2445178 7/2008

OTHER PUBLICATIONS

International Search Report and Written Opinion issued in connection with PCT/US2010/042296, Oct. 6, 2010.

\* cited by examiner

*Primary Examiner* — Van Chow
(74) *Attorney, Agent, or Firm* — Hanley, Flight & Zimmerman, LLC

(57) ABSTRACT

Certain examples provide systems, apparatus, articles of manufacture, and methods for medical device interface overlay. In an example, an article of manufacture includes an overlay for a clinical device touchscreen interface. The overlay includes a background surface formed to contact a touchscreen interface. The overlay also includes a plurality of touch areas formed in the background surface of the overlay device. Each of the plurality of touch areas is to provide a tactile boundary for a corresponding touchscreen interface function. The plurality of touch areas includes at least one of a plurality of openings and a plurality of recessed areas including a material thickness less than the material thickness of the background surface. The plurality of openings and the plurality of recessed areas allow user contact and interaction with the user interface underneath the overlay.

20 Claims, 8 Drawing Sheets

IMAGING MULTI-MODALITY TOUCH PAD INTERFACE SYSTEMS, METHODS, ARTICLES OF MANUFACTURE, AND APPARATUS

RELATED APPLICATIONS

[Not Applicable]

FEDERALLY SPONSORED RESEARCH OR DEVELOPMENT

[Not Applicable]

MICROFICHE/COPYRIGHT REFERENCE

[Not Applicable]

BACKGROUND

The present invention generally relates to medical device interfacing. In particular, the present invention relates to systems, apparatus, and methods for medical device interface overlays.

Many medical devices include touchscreen displays, such as liquid crystal displays (LCDs) with touchpads. The touchpads or other touchscreen are programmed to display certain options and generate a programmable callback in respect to a user touching a programmed shape on the interface. Callbacks are sent to the host computer through a universal serial bus (USB) and/or other conventional interface. Thus, a graphical user interface (GUI) can be configured with a touchscreen to receive user input. However, the GUI interfaces lack feedback and tactile sensation for "blind" key location and require visual distraction from a user task at hand to locate and select an interface option.

For example, diagnostic imaging equipment provides information regarding human anatomy and functional performance presented via a large number of images in two- and three-dimensional interpretation. Diligent interpretation of these images requires following of a strict workflow; and each step of the workflow presumes presentation of an image on the screen in a certain order of a certain image series from one or more exams, along with application of certain tools for manipulation of the images (e.g., image scrolling, brightness/ contrast, linear and area measurements, etc.). Diagnostic reading software provides options for image manipulation and tooling, such as on-screen menus, toolbars, mouse clicks, and keyboard shortcuts. Graphical on-screen options require a defocusing of a user's gaze from the diagnostic image content to search for the proper graphical element, which is often located in remote location on the screen or even on another computer monitor. Similarly, selection of few applicable shortcut keys (e.g., 8-10) out of 104 standard keyboard keys also requires substantial distraction from analyzed visual content.

Thus, certain medical devices provide controls on a dedicated keypad with a limited number of keys arranged in ergonomic geometry for blind finger location (similar to blind locating of keys on a piano or strings on a guitar), shape (such as discerning between "white" and "black" keys on the piano), and texture (such as "-" shaped bumps on "F" and "J" keys on a computer keyboard to identify the home row). The specialized keyboard has a unique dedication to a certain application to optimize key functionality, position, shape and texture for the purpose of that particular application and associated workflow. Therefore, development and production of dedicated keyboards is limited to a narrow application and does not benefit from any "economy of scale" through mass production and wide application. Additionally, rapid changes in clinical technologies and methods result in corresponding rapid changes in clinical workflow, which require modification of the keyboard. While frequently redesigning keyboard and/or other clinical interfaces quickly becomes cost prohibitive, keeping the keyboard unchanged substantially impairs its efficiency and reduces its usage. Further, providing dedicated keyboards renders them largely useless for a computer workstation running multiple clinical applications. Attaching multiple dedicated interface devices to a single workstation is impractical and clogs available desktop real estate.

BRIEF SUMMARY

Certain examples provide systems, apparatus, articles of manufacture, and methods for medical device interface overlay.

In an example, a medical touchscreen interface overlay device includes a background surface contacting a touchscreen interface. The background surface does not generate a response from the interface when contacted by a user. The interface overlay device also includes a plurality of touch areas formed in the background surface of the overlay device. The plurality of touch areas have a lesser thickness than the background surface. Each of the plurality of touch areas is to provide a tactile boundary for a corresponding touchscreen interface function, and each of the plurality of touch areas is formed in a shape representative of the corresponding touchscreen interface function. The overlay device is at least temporarily affixed to the touchscreen interface to facilitate user interaction with the touchscreen interface.

In an example, an article of manufacture includes an overlay for a clinical device touchscreen interface. The overlay includes a background surface formed to contact a touchscreen interface. The overlay also includes a plurality of touch areas formed in the background surface of the overlay device. Each of the plurality of touch areas is to provide a tactile boundary for a corresponding touchscreen interface function. The plurality of touch areas includes at least one of a plurality of openings and a plurality of recessed areas including a material thickness less than the material thickness of the background surface. The plurality of openings and the plurality of recessed areas allow user contact and interaction with the user interface underneath the overlay.

In an example, a touchscreen overlay apparatus includes an adhesive strip overlay for a clinical device touchscreen interface. The adhesive strip overlay includes a background surface with adhesive backing formed to contact a touchscreen interface and one or more touch areas formed in the background surface of the overlay device. The one or more touch areas include at least one recessed area and/or at least one raised area to facilitate selection of functionality available on the clinical device touchscreen interface.

Figure 1:
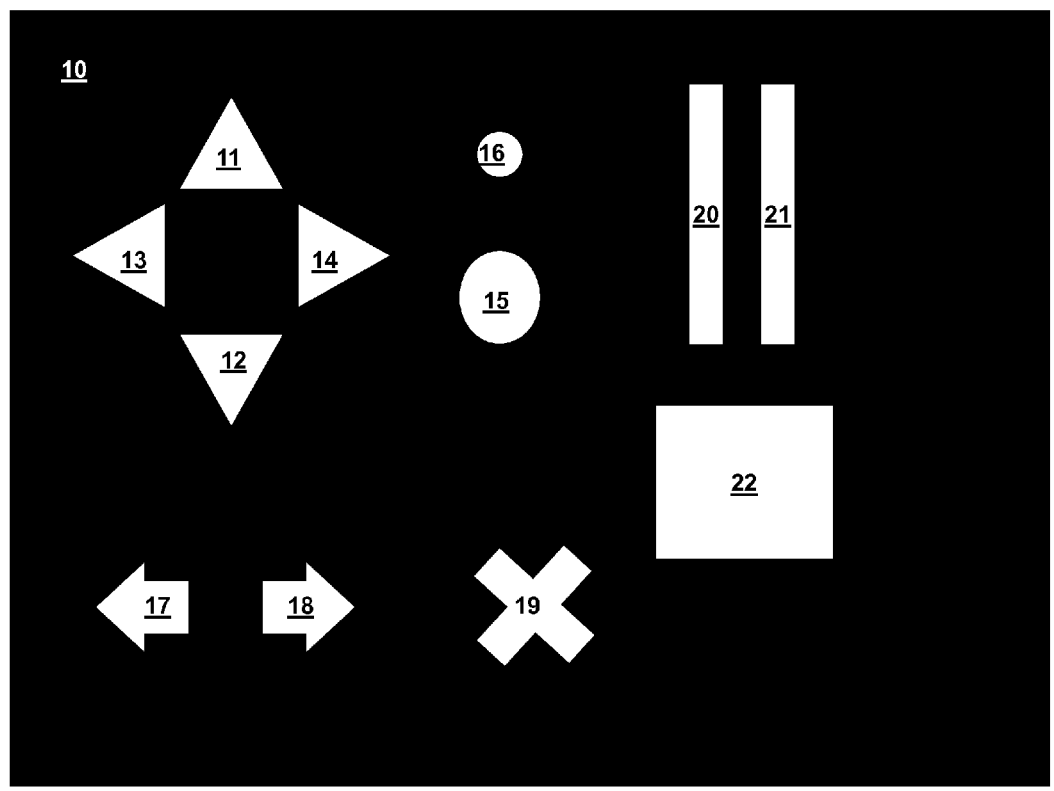
FIG. 1 illustrates an example representation of an overlay for a touch sensitive screen.

The foregoing summary, as well as the following detailed description of certain embodiments of the present invention, will be better understood when read in conjunction with the appended drawings. For the purpose of illustrating the invention, certain embodiments are shown in the drawings. It should be understood, however, that the present invention is not limited to the arrangements and instrumentality shown in the attached drawings.

DETAILED DESCRIPTION OF CERTAIN EXAMPLES

Although the following discloses example methods, systems, articles of manufacture, and apparatus including, among other components, software executed on hardware, it should be noted that such methods and apparatus are merely illustrative and should not be considered as limiting. For example, it is contemplated that any or all of these hardware and software components could be embodied exclusively in hardware, exclusively in software, exclusively in firmware, or in any combination of hardware, software, and/or firmware. Accordingly, while the following describes example methods, systems, articles of manufacture, and apparatus, the examples provided are not the only way to implement such methods, systems, articles of manufacture, and apparatus.

When any of the appended claims are read to cover a purely software and/or firmware implementation, at least one of the elements is hereby expressly defined to include a tangible medium such as a memory, a digital video disc (DVD), compact disc (CD), etc. storing the software and/or firmware.

A multi-modality touchscreen (e.g., a touch pad, touch panel, touch switch, touch surface, gestural interface, dual touchscreen, and/or other touchscreen) overlay is provided to customize a medical device touchscreen according to one or more criteria such as an application, an operation, a user, a group, and/or other configuration. For example, many medical and other devices and/or controls include a touchscreen to control operation of the device and/or to provide feedback from the device. A touchscreen interface can display areas representing buttons, knobs, rulers, etc., for an input device, for example. An interface or overlay is provided with openings corresponding to the representing buttons, knobs, rulers, etc., for the touchscreen interface. Thus, the overlay can provide tactile feedback for a user to utilize the touchscreen interface more effectively (e.g., facilitating usability and user selection of interface options without looking at the touchscreen). For example, a touchpad with a liquid crystal display (LCD) background can be overlaid to provide tactile feedback. An overlay can be temporarily placed over the touchscreen, temporarily affixed to the touchscreen, permanently affixed to the touchscreen, etc. The touchscreen can be implemented in a variety of ways including a resistive touchscreen, a surface acoustic wave touchscreen, capacitive touchscreen, projected capacitance touchscreen, infrared touchscreen, strain gauge or force panel touchscreen, optical imaging touchscreen, dispersive signal touchscreen, acoustic pulse recognition touchscreen, etc.

Certain examples provide a novel technology allowing for easy and inexpensive production and configuration of highly customizable and versatile workflow-oriented keyboards and/or keypads. Current examples provide a device including an LCD display with a touchpad overlay that can be programmed to display various shapes and generate one or more programmable callbacks in respect to touching each of programmed shapes. The callbacks are sent to a host computer through a connection such as a universal serial bus (USB) and/or other conventional interface. The devices can be used for fast prototyping, customization and implementation of an application specific graphical user interface (GUI) by programming a layout of the on-screen shapes and attaching a standard keyboard ASCII code to provide a response upon touching of each programmed shape. The interface overcomes the problems of "blind" key location and visual distraction from content review by instrumenting the touchpad with a hardware (e.g., plastic) overlay that at least substantially covers unused surface area and exposes active touchpad buttons through punched and/or otherwise opened shapes including but not limited to rectangles, triangles, strips circles, and other reasonable and adequate openings to help facilitate blind searching for keys. In addition to shape and position, "blind location" can be enhanced by adding various textures to different areas of the plastic cover and/or a bumpy shape to the edges of the recessions in the overlay, for example.

FIG. 1 illustrates an example representation of an overlay 10 for a touch sensitive screen, such as an LCD touchscreen. The touchscreen overlay 10 includes a plurality of keystroke areas and control strips. Each of these areas has a shape representative of its application. For example, the background surface 10 of the touch sensitive screen does not generate an underlying system response when contacted by a user.

Figure 2:
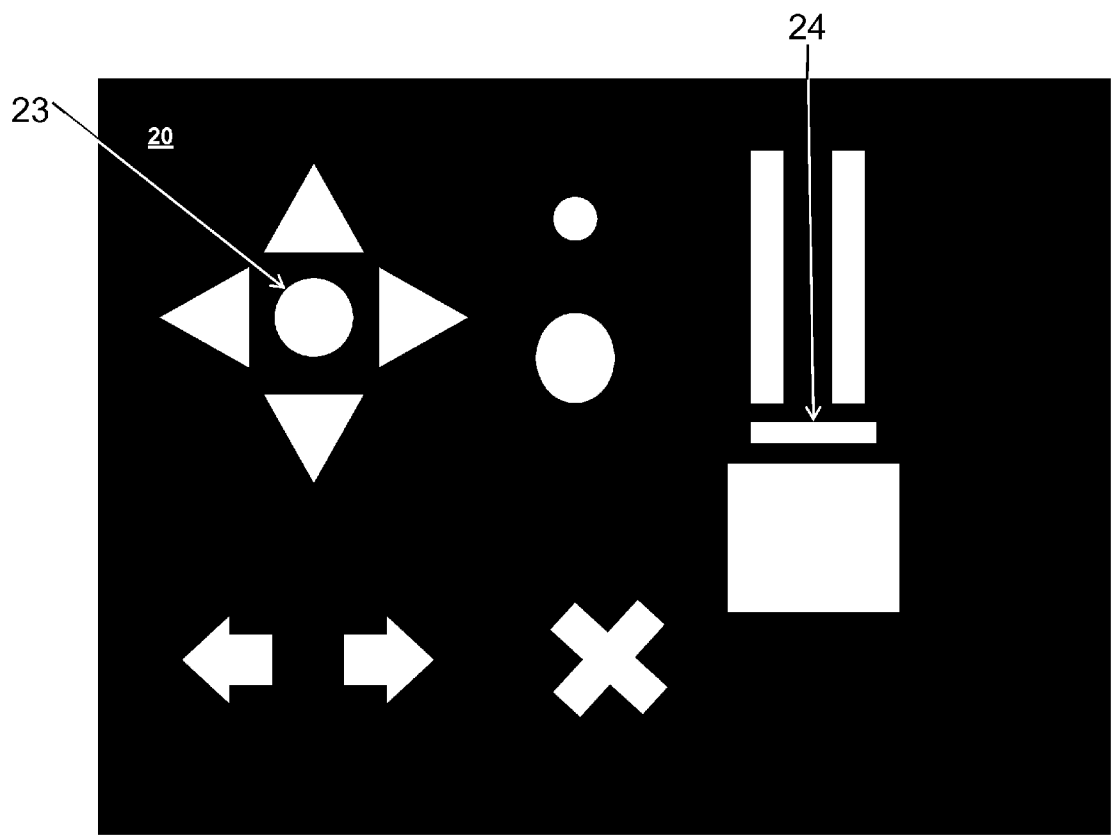
FIG. 2 depicts an example representation of an overlay for a touchscreen.

A plurality of triangular openings 11, 12, 13, and 14 define interface boundaries for directional controls, for example. That is, in an image review application, arrow 10 corresponds to functionality enabling a user to scroll forward for a next image in an image stack. Triangle 12 corresponds to functionality enabling a user to scroll backwards for a previous image in the image stack. Opening 13 provides a tactile boundary for a touchscreen function allowing a user to return to a previous image series. Opening 14 provides a tactile boundary for a touchscreen function allowing a user to progress to a next image series. Areas 15 and 16 help define options for zooming in 15 and zooming out 16 in an image and/or other display. Arrows 17 and 18 define areas allowing a user to proceed to a next workflow step 17 and/or roll back to a previous workflow step 18. Area 19 corresponds to an exit option allowing a use to exit an application, for example. Slider area 20 corresponds to slider functionality increasing and/or decreasing brightness. Similarly, slider area 21 corresponds to slider functionality increasing and/or decreasing contrast. Area 22 provides tactile feedback to locate touchscreen functionality allowing a user to pan an image following user finger motion FIG. 2 depicts an overlay 20 similar to the overlay 10 of FIG. 1, described above. The overlay 20 provides punched windows/openings exposing touch control shapes of an underlying touchscreen control with additional tactile "bumps" 31, 32 to facilitate blind location of the respective shapes in the overlay 20. For example, plastic cover overlay 20 features punched windows exposing the touch-control shapes of an underlying LCD touchscreen and tactile "bumps" 23 and 24 for easy blind location of the respective shapes.

Figure 3:
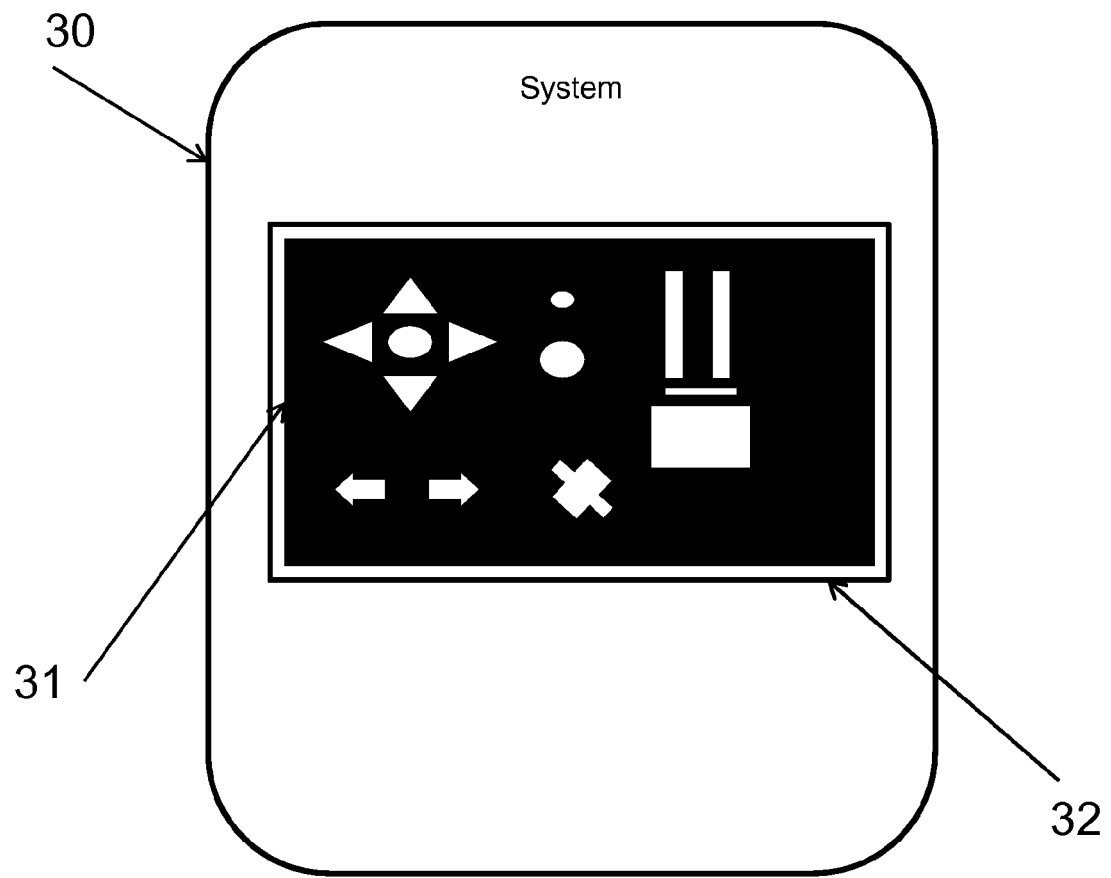
FIG. 3 illustrates how an overlay can be used with a touchscreen for a system.

FIG. 3 illustrates how an overlay 31, similar to the overlays 10, 20 of FIGS. 1 and 2 described above, can be used with a touchscreen 32 for a system 30. For example, a radiology review workstation and/or other computer 30 for diagnostic reading of digital medical exams including digital radiology imaging can include a touchscreen 32 used with an overlay 31. Diagnostic imaging equipment provides extensive information regarding the human body anatomy and functional performance presented through a large number of images in two- and three-dimensional interpretation. Diligent interpretation of these images requires following of a strict workflow. Each step of the workflow presumes presentation of one or more images on a computer screen in an order of image series from one or more exams and application of certain tools for manipulation over the images (including but not limited to image scrolling, brightness/contrast, linear and area measurements, etc.). Diagnostic reading software provides various options for image manipulation and tool operation including but not limited to on-screen menus, toolbars, mouse clicks, keyboard shortcuts, etc. Graphical on-screen options naturally involve defocusing of a user's eye-sight from the diagnostic image content in search of a proper graphical element, which is often located in remote location on the screen or even on another computer monitor. Additionally, selection of an applicable shortcut key (usually no more than 8-10) out of 104 standard keyboard keys also involves substantial distraction from analyzing visual content. By applying the overlay 31 on top of the touchscreen interface 32, functionality can be more easily identified by a user via tactile physical sensation without diverting a large degree of focus from the visual content being displayed and analyzed on the system 30.

Figure 4:
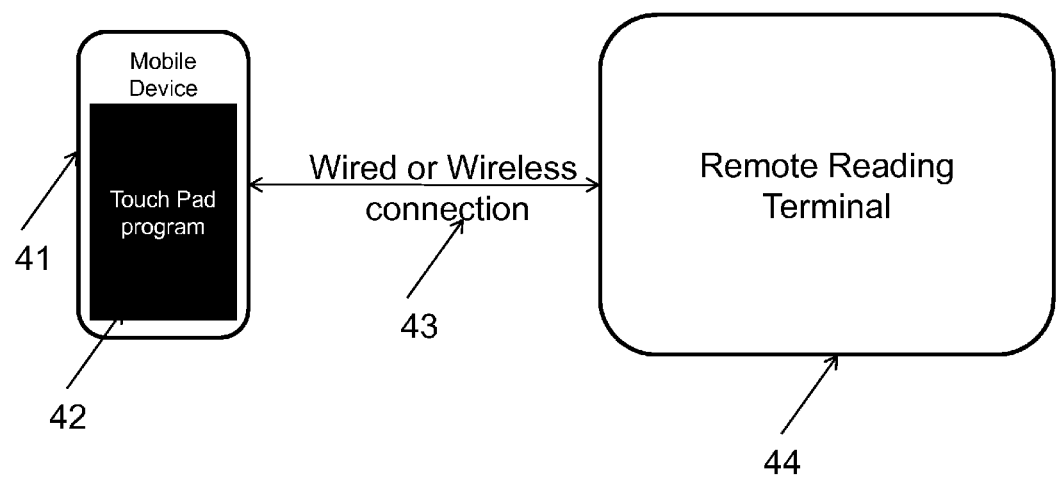
FIG. 4 represents an example connection system and method between a mobile device and a reading terminal to provide a universal touch pad module.

FIG. 4 represents an example connection system and method 400 between a mobile device 41 and a reading terminal 44 to provide a universal touch pad module 42 via a wired and/or wireless connection 43. The mobile device 41 controls operation of the remote reading terminal 44 via the connection 43. Alternatively or in addition, the mobile device 41 provides information to and/or accesses information from the remote reading terminal 44 via the connection 43. A touchpad overlay with associated interface program 42 on the mobile device 41 enables tactile feedback from the user interface and/or customization of the user interface at the mobile device 41. For example, the graphical user interface of the mobile device 41 can be configured to mirror a graphical user interface at the remote reading terminal 44 using the touchpad module 42.

In some examples, the touchpad overlay 42 is implemented as a plastic cover that fits on or over the mobile device 41. The touchpad overlay 42 and associated program allows the mobile device 41 to function as a touch pad control from the remote reading terminal 44. In some examples, shapes can be drawn on a screen of the mobile device 41 to provide a "soft" touch pad.

In some examples, the mobile device 41 can be configured to operate in at least one of two modes. In a first mode, a plastic mold, adhesive strip, or other overlay 42 is mounted on the mobile device 41 itself. The plastic mold 42 includes a section for self-identification, such as a four-digit identifier, pattern of protrusions, etc. The mold 42 defines areas of the underlying touchpad that can be used to control functionality, access information, etc. The plastic mold overlay 42 can include openings in a solid mold, areas of varying mold thickness, areas of sunken and raised shapes, etc., for example. The mold overlay 42 can be used for a combination of shape and touch based identification, for example. In a second mode, a user puts pressure on the screen of a soft touchpad 42 of the device 41 where shapes are displayed on the touchpad screen to indicate functionality and/or other features for selection.

As described above, a touchpad overlay can be implemented in a variety of configurations using a variety of materials and processes for manufacture. In a first example, a touchpad LCD display is attached to a computer via a connected such as a USB port with a hard-coded graphical layout including geometrical elements of various shape and colors and hard-coded ASCII codes generated in response to touching of each shape. The touchpad LCD display is covered by a plastic sheet with punched holes exposing only the pre-programmed shapes, for example. The plastic sheet can include openings in a solid mold, areas of varying mold thickness, areas of sunken and raised shapes, etc., for example. The plastic sheet overlay can be used for a combination of shape and touch based identification, for example. The plastic sheet can be a mold fitting on and/or over the touchpad, an adhesive sheet at least temporarily affixed to the touchpad, etc. In operation, touching any of the exposed surface area is equivalent to selecting an appropriate key on a keyboard and/or keypad with matching ASCII code. Thus, if such a key is programmed as an application shortcut, hitting the proper shape on the device will cause the desired actions within computer application. In an example, the touch pad device can be wirelessly connected to the computing device. In such case, the touch pad device pairs with the computing device. In an example, the touch pad device may not be a dedicated device but rather an embedded device pair with a programming component to translate a user request to user actions for the computing device. Alternatively and/or in addition to an ASCII code, a combination of a code identifier, a velocity (e.g., right/left and/or up/down speed of motion), and pressure (e.g., strength and spatial aspects (e.g., a combination of several shapes and/or multi-touch within a shape)) can be used to define the type of change and scale of change in a controlled value or parameter, for example.

In a second example, the device described above with respect to the first example is equipped with multiple shapes and code configurations each optimized by a different computer application and/or by a different workflow within the same application. When an application and/or workflow is activated, the application or workflow automatically loads the proper configuration into the device and prompts the user to overlay the respective plastic cover on LCD touchscreen.

In a third example, in addition to the shapes that generate an ASCII code in response to hitting the shape substantially independent of the relative location of the hitting point, as described above in the first example, the device of the third example includes extended shapes that generate the digital signal whose value depends on the relative position of the touching body within the shape. Thus, the device can simulate "analog" controls similar to sliders, knobs and the like. Such extended shapes can be referred as "Control Strips" although their actual shape can be curved or even circular, for example. Introduction of such control strips can be beneficial to control transient parameters such as contrast/brightness; zoom/pan; or scrolling through a stack of images, for example. Alternatively and/or in addition to an ASCII code, a combination of a code identifier, a velocity (e.g., right/left and/or up/down speed of motion), and pressure (e.g., strength and spatial aspects (e.g., a combination of several shapes and/or multi-touch within a shape)) can be used to define the type of change and scale of change in a controlled value or parameter, for example. An identifier associated with a selected shape, an identifier associated with the cover or overlay, and/or other information (such as private data used to define a motion context and/or motion profile for a certain application and/or set of data) can be used by an application to facilitate touch-screen operation of the device.

In a fourth example, a device combines the features described above in examples one, two, and three. The device includes a set of standard or template overlay plates, and a computer application facilitates configuring the touchpad layout to match any of the standard overlays. The application can associate one or more actions with a touchpad layout and an opening in a selected overlay. The application provides a toolkit allowing a user to set the layout of the touchpad with respect to any of the set of overlays and to directly assign one or more application controlling actions to the shapes of the selected layout. Thus, the application can be interactively customized to provide a personalized application touchpad with tactile blind key location.

In a fifth example, a device includes a combination of the devices described above with respect to examples two, three, and four. The device includes a set of profiling parameters to characterize action intensity. The action intensity translates to how fast a desired state or range close to the desire state is reached using a touchpad control. The touchpad control and one or more profiling parameters can be matched and customized to an overlay.

In a sixth example, a device provides a combination of the devices described in examples two and three that allows a user to manipulate several controls simultaneously or substantially simultaneously (e.g., multi-touch control). Combination of control allows set of new requests and/or execution of independent request simultaneously (or at least substantially simultaneously).

In a seventh example, a device is similar to the device described above with respect to example one but also allows a user and/or application to define a configurable touch pad integrated, embedded, and/or connected (e.g., wireless or with a physical cable) to a workstation.

In an eighth example, a device provides a combination of the devices described with respect to examples one through seven and allows a user and/or application to define a touch pad application running on a third party component such as but not limited to a mobile Internet device. An overlay attaches to the mobile device, and the device includes one or more applications to configure the device to act as a touch pad. The mobile device can be connected to a workstation via a wireless interface including but not limited to an Internet connection (e.g., WiFi, telephonic, etc.), proximity communication interface (e.g., Bluetooth, infrared, RFID, etc.), USB, etc. wireless connection. In some examples, the mobile device can connect to the workstation via a wired connection (e.g., USB, firewire (IEEE 1394), etc.).

In some examples, an overlay can be formed from a punchboard and/or similar material for a variety of applications. In an example, a punchboard is created, and then a user traces, such as using a pencil or stylus, a contour of touches/punches to teach the shapes of the overlay to a touchscreen application. Then, a keystroke or combination of keystrokes and/or functions can be assigned to the shape(s) defined. For example, an application programming interface (API) function and/or application command can be assigned to a shape traced in the overlay.

In some examples, universal overlay templates are provided with multiple uses. Some examples provide a comprehensive tool set in conjunction with a set or deck of overlay templates and/or one or more adjustable overlays. A user can customize a generic template (e.g., with functions such as adjust, next/forward, previous/backward, sliders (for contrast, brightness, volume, balance, etc.), and the like).

In some examples, an overlay is constructed from plastic or a combination of plastic and a membrane so that the overlay can be sterilized in an operating room and/or other location where a sterile environment is needed. In an example, an overlay can be manufactured from a thick latex material having thin latex in depressions for user contact. An overlay can be made tactile sensitive in different ways. In some examples, a set of sterile covers including plastic and membrane is sterilized separately from the touchpad, which perhaps cannot be sterilized due to the contents of the touchpad device. In some examples, sterile covers and/or overlays can be disposable covers and/or re-sterilizable overlays. In some examples, an overlay is formed from at least one adhesive strip including molded shapes (e.g., recessed, elevated, etc.) that can be temporarily affixed to the touch pad surface or other mobile device surface, for example. The adhesive strip can be disposable, sterilizable, and/or resistant to bacteria for use in a sterile environment or medical facility with concerns regarding risk of infection, for example.

In some examples, an overlay stands on a plurality of legs, and the position of the legs can encode the type of touchscreen provided. For a multi-touch pad, the combination of legs touching can serve as an indicator, such as a barcode, to tell the touchscreen which template has been placed on it. For example, an overlay can be placed on the touchscreen by a user who pushes down on the overlay such that the touchscreen automatically recognizes the overlay based on the leg position(s).

Alternatively or in addition, an overlay can include an indicator, such as an active or passive circuit (e.g., a radio frequency identifier (RFID)), to indicate to a touchscreen system which overlay has been placed on the touchscreen.

In some examples, an application associated with the touchscreen can provide error checking and prompt a user to change the overlay template if the wrong overlay is currently placed on the touchscreen.

Certain examples provide touchscreen overlays for systems facilitating computerized reading of diagnostic imaging. Certain examples can also apply to other information system(s) dedicated to processing digital visual content, provided that such processing involves at least some workflow steps controlled by user interaction and involves the focused attention of the operator on a graphical representation of the processed content presented on a display. De-focusing an operator's view from the content onto control elements of a graphical user interface causes the operator to lose focus and thus can reduce productivity and efficiency of content processing.

Figure 5:
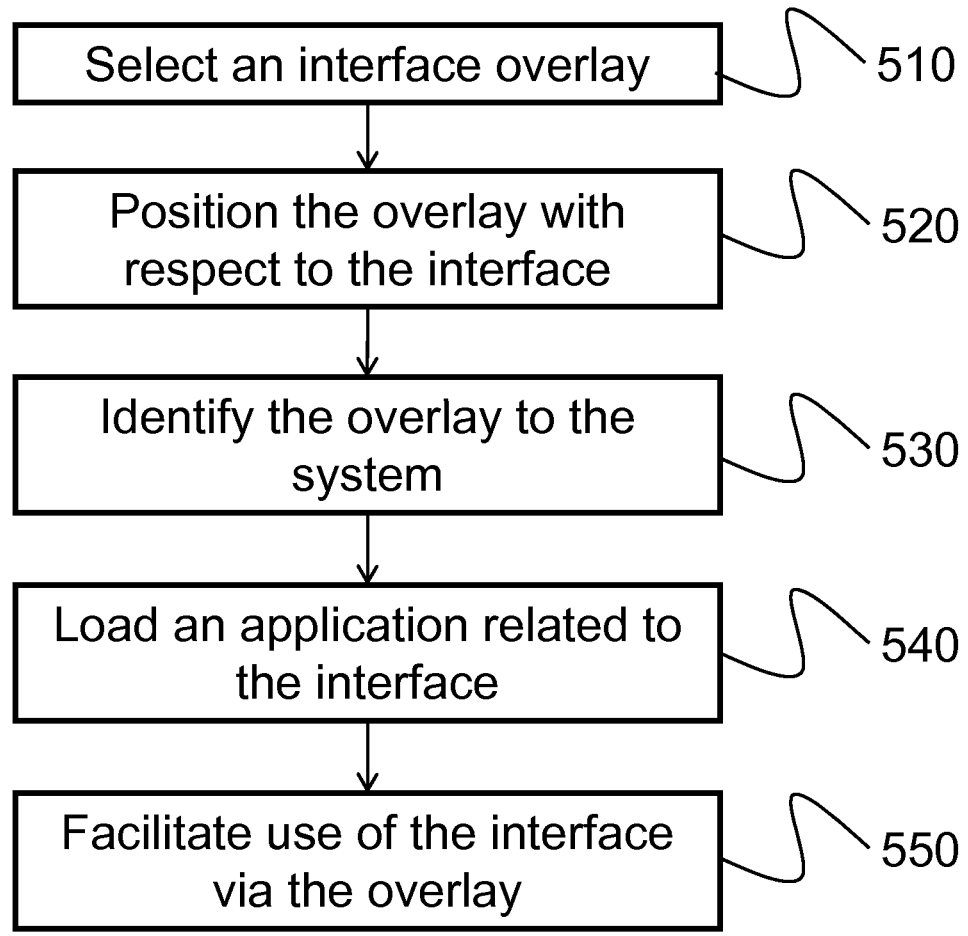
FIG. 5 depicts an example method to apply an overlay to a clinical system interface.

FIG. 5 depicts an example method 500 to apply an overlay to a clinical system interface. At block 510, an overlay is selected for a system interface. For example, an overlay can be selected with appropriate openings for an external touchscreen control for a digital pathology microscope. The overlay can be automatically selected via a computer and/or manually selected by a user, for example.

At block 520, the overlay is positioned with respect to the interface. For example, the overlay can be manually positioned over the interface and/or automatically guided by a supporting computer system. The overlay can be positioned to rest on the interface and/or can be temporarily and/or removably affixed to the touchscreen interface via one or more connectors (e.g., sticky areas, clasps, pins, clamps, etc.).

At block 530, the overlay is identified by the interface system. For example, a user can manually identify the overlay to the interface system. Alternatively or in addition, an indicator in the interface (e.g., a marking, an RFID, a surface material, etc.) can provide an automatic indication to the interface of the overlay present. In some examples, an overlay is provided with a touchscreen interface, and the interface system automatically identifies the overlay based on an identification code in the overlay (e.g., RFID, etc.), a protrusion in the overlay, a pressure pin, etc., when the overlay is connected to the touchscreen and/or mobile device.

At block 540, an application related to interface is loaded. For example, in response to the overlay placement on the interface, a corresponding control application is loaded to allow a user to control operation and/or otherwise interface with the system.

At block 550, use of the interface is facilitated via the overlay. For example, the controls operation of the microscope for digital pathology using the tactile overlay and the touchscreen interface.

In some examples, one or more of these blocks can be eliminated and/or executed in a different order. For example, no overlay identification may be performed.

Figure 6:
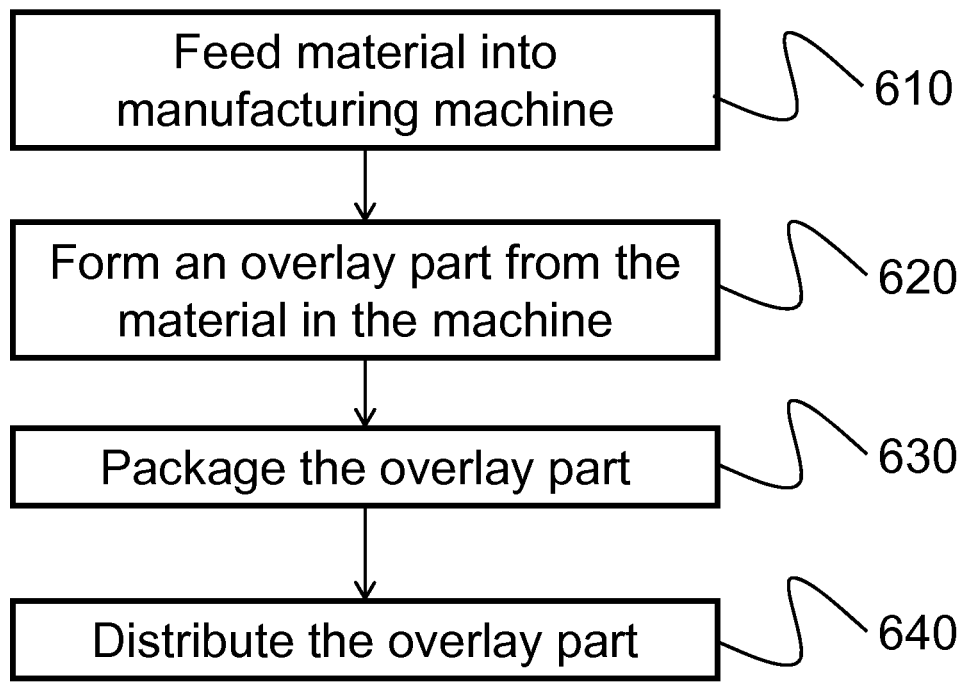
FIG. 6 depicts an example method to manufacture a touchscreen interface overlay.

FIG. 6 depicts an example method 600 to manufacture a touchscreen interface overlay, such as the overlay 10, 20, 31, and/or 42 described above. At block 610, material to form the overlay is fed into a machine to manufacture the overlay part. For example, a plastic material is fed from a storage container into an injection molding machine to form a plastic overlay part. In injection molding, for example, the material is fed into a heated barrel or other cavity. The cavity can be formed from a material, such as a metal (e.g., steel or aluminum) and machined to form the features of the desired part. Plastic material can be thermoplastic and/or thermosetting plastic material, for example. Material can also include a composite, non-conducting material, a metal, a mesh, a film, and/or other material, for example.

At block 620, the overlay part is formed from the material. For example, in injection molding, the plastic is heated, mixed, and forced into a mold cavity to cool and harden to the configuration of the mold cavity. Alternatively, a variety of other processes, such as overmolding, extrusion molding, transfer molding, compression molding, thermoforming, stamping, etching, etc., can be used to form the overlay part. Injection molding is provided as one example.

At block 630, the overlay part is packaged. The part can be packaged automatically, such as by machinery in an assembly line, manually, and/or a combination of automatic and manual assembly and packaging. For example, one or more overlay parts can be boxed for sale and shipping. As another example, one or more overlay parts can be individually wrapped (e.g., in a plastic bag or wrapper) and distributed as a disposable set of overlays.

At block 640, the overlay part is distributed. For example, as discussed above, overlay parts can be sold and distributed as reusable items and/or disposable units, for example. Overlay parts can be distributed and sold directly to clinical facilities (e.g., hospitals, doctors' offices, etc.), sold to medical suppliers, given away with medical equipment, etc.

Figure 7:
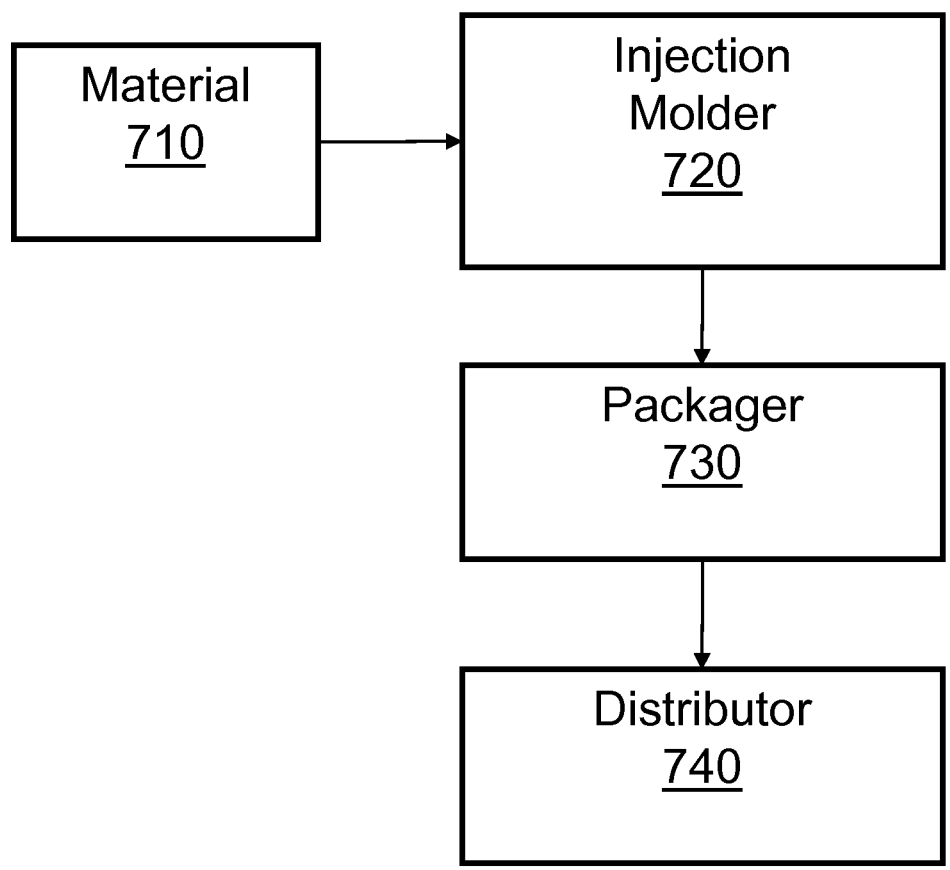
FIG. 7 illustrates an example system for overlay part manufacture.

FIG. 7 illustrates an example system for overlay part manufacture. The system 700 includes a material source 710, an injection molder and/or other overlay part manufacturer 720, a packager 730, and a distributor 740. The system 700 can be used to implement the method 600, for example.

The material source 710 holds material to form a user interface overlay part, such as the overlay 10, 20, 31, and/or 42. The molder 720 receives material from the source 710. For example, a plastic material is fed from the material source 710 into the injection molding machine 720 to form a plastic overlay part. In injection molding, for example, the material is fed into a heated barrel or other cavity. The cavity can be formed from a material, such as a metal (e.g., steel or aluminum) and machined to form the features of the desired part. Plastic material can be thermoplastic and/or thermosetting plastic material, for example. Material can also include a composite, non-conducting material, a metal, a mesh, a film, and/or other material, for example. The molder 720 forms the overlay part is formed from the provided material. For example, in injection molding, the plastic is heated, mixed, and forced into a mold cavity to cool and harden to the configuration of the mold cavity. Alternatively, a variety of other processes, such as overmolding, extrusion molding, transfer molding, compression molding, thermoforming, stamping, etching, etc., can be used to form the overlay part. Injection molding is provided as one example.

After the overlay part has been formed by molding, stamping, etching, etc., the part is passed from the molder to the packager 730. For example, the packager 730 can box one or more overlay parts for shipping and sale. As another example, one or more overlay parts can be individually wrapped (e.g., in a plastic bag or wrapper) by the packager 730 and distributed as a disposable set of overlays.

The packager 730 releases the packaged overlay part(s) to the distributor 740. The distributor can distribute overlay parts individually and/or in groups or bundles, for example. The overlay parts can be distributed alone and/or with other product(s). Overlay parts can be sold and distributed as reusable items and/or disposable units, for example. Overlay parts can be distributed and sold directly to clinical facilities (e.g., hospitals, doctors' offices, etc.), sold to medical suppliers, given away with medical equipment, etc.

Figure 8:
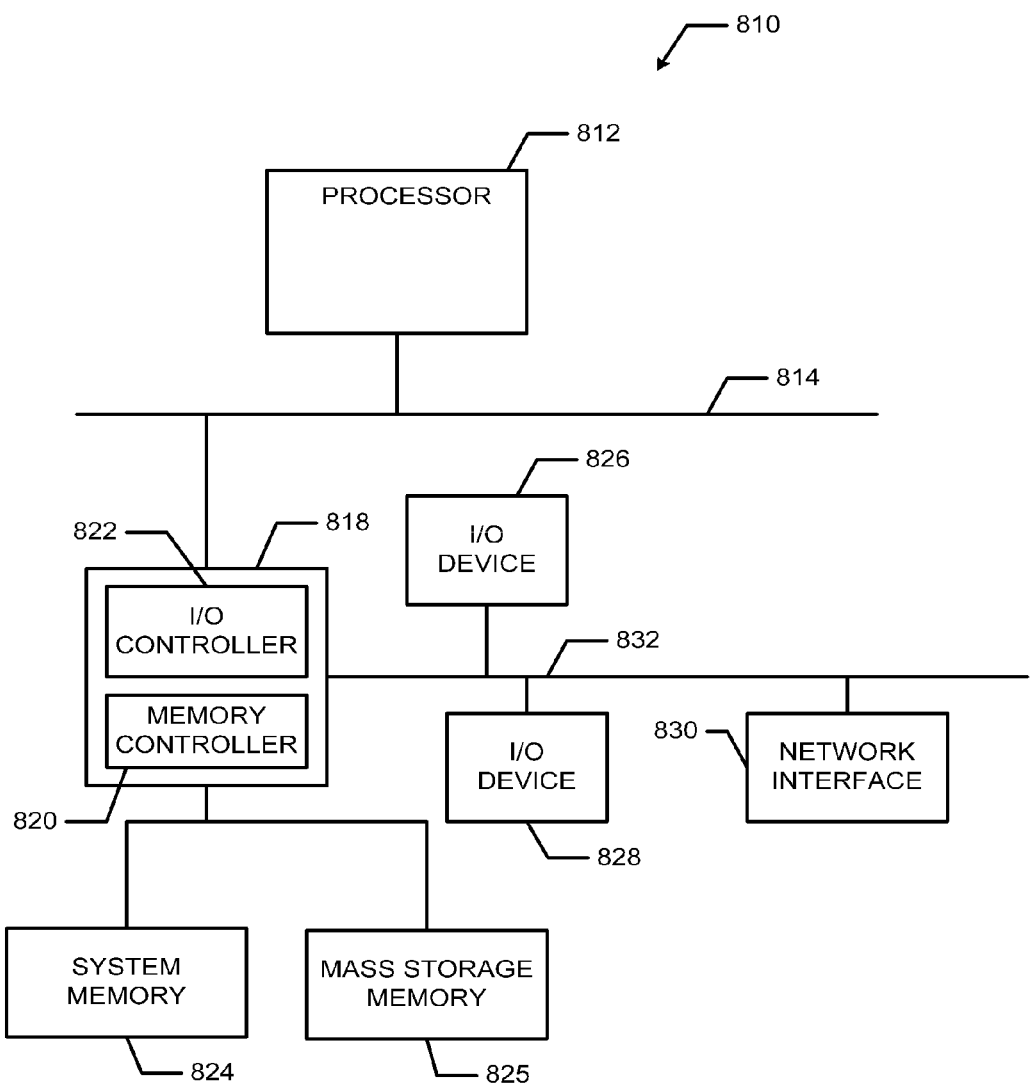
FIG. 8 is a block diagram of an example processor system that may be used to implement systems, apparatus, and methods described herein.

FIG. 8 is a block diagram of an example processor system 810 that may be used to implement systems, apparatus, and methods described herein. As shown in FIG. 8, the processor system 810 includes a processor 812 that is coupled to an interconnection bus 814. The processor 812 may be any suitable processor, processing unit, or microprocessor, for example. Although not shown in FIG. 8, the system 810 may be a multi-processor system and, thus, may include one or more additional processors that are identical or similar to the processor 812 and that are communicatively coupled to the interconnection bus 814.

The processor 812 of FIG. 8 is coupled to a chipset 818, which includes a memory controller 820 and an input/output ("I/O") controller 822. As is well known, a chipset typically provides I/O and memory management functions as well as a plurality of general purpose and/or special purpose registers, timers, etc. that are accessible or used by one or more processors coupled to the chipset 818. The memory controller 820 performs functions that enable the processor 812 (or processors if there are multiple processors) to access a system memory 824 and a mass storage memory 825.

The system memory 824 may include any desired type of volatile and/or non-volatile memory such as, for example, static random access memory (SRAM), dynamic random access memory (DRAM), flash memory, read-only memory (ROM), etc. The mass storage memory 825 may include any desired type of mass storage device including hard disk drives, optical drives, tape storage devices, etc.

The I/O controller 822 performs functions that enable the processor 812 to communicate with peripheral input/output ("I/O") devices 826 and 828 and a network interface 830 via an I/O bus 832. The I/O devices 826 and 828 may be any desired type of I/O device such as, for example, a keyboard, a video display or monitor, a mouse, etc. The network interface 830 may be, for example, an Ethernet device, an asynchronous transfer mode ("ATM") device, an 802.11 device, a DSL modem, a cable modem, a cellular modem, etc. that enables the processor system 810 to communicate with another processor system.

While the memory controller 820 and the I/O controller 822 are depicted in FIG. 8 as separate blocks within the chipset 818, the functions performed by these blocks may be integrated within a single semiconductor circuit or may be implemented using two or more separate integrated circuits.

Certain embodiments contemplate methods, systems and computer program products on any machine-readable media to implement functionality described above. Certain embodiments may be implemented using an existing computer processor, or by a special purpose computer processor incorporated for this or another purpose or by a hardwired and/or firmware system, for example.

Some or all of the system, apparatus, and/or article of manufacture components described above, or parts thereof, can be implemented using instructions, code, and/or other software and/or firmware, etc. stored on a machine accessible or readable medium and executable by, for example, a processor system (e.g., the example processor system 810 of FIG. 8). When any of the appended claims are read to cover a purely software and/or firmware implementation, at least one of the components is hereby expressly defined to include a tangible medium such as a memory, DVD, CD, etc. storing the software and/or firmware.

FIGS. 6 and 7 include flow diagrams representative of machine readable and executable instructions or processes that can be executed to implement the example systems, apparatus, and article of manufacture described herein. The example processes of FIGS. 6 and 8 can be performed using a processor, a controller and/or any other suitable processing device. For example, the example processes of FIGS. 6 and 7 can be implemented in coded instructions stored on a tangible medium such as a flash memory, a read-only memory (ROM) and/or random-access memory (RAM) associated with a processor (e.g., the processor 812 of FIG. 8). Alternatively, some or all of the example processes of FIGS. 6 and 7 can be implemented using any combination(s) of application specific integrated circuit(s) (ASIC(s)), programmable logic device(s) (PLD(s)), field programmable logic device(s) (FPLD(s)), discrete logic, hardware, firmware, etc. Also, some or all of the example processes of FIGS. 6 and 7 can be implemented manually or as any combination(s) of any of the foregoing techniques, for example, any combination of firmware, software, discrete logic and/or hardware. Further, although the example processes of FIGS. 6 and 7 are described with reference to the flow diagrams of FIGS. 6 and 7, other methods of implementing the processes of FIGS. 6 and 7 can be employed. For example, the order of execution of the blocks may be changed, and/or some of the blocks described may be changed, eliminated, sub-divided, or combined. Additionally, any or all of the example processes of FIGS. 6 and 7 can be performed sequentially and/or in parallel by, for example, separate processing threads, processors, devices, discrete logic, circuits, etc.

Thus, certain examples provide for easy and inexpensive production of highly customizable and versatile workflow-oriented keyboards and/or other touchscreen overlays. Certain examples provide tactile feedback for touchscreen interfaces without modification of the touchscreen itself. Certain examples provide portable overlays for use with a plurality of clinical touchscreen interfaces. Certain examples provide a tool kit (disposable and/or reusable) of overlays for selection by a user (and/or by device prompt) to accommodate a variety of medical device interfaces.

In certain example, a touchpad is instrumented with a hardware plastic overlay to cover unused interface surface area and expose active touchpad buttons through blindly searchable punched shapes such as, but not limited to, rectangles, triangles, strips, circles, and/or other appropriate shape openings. In addition to shape and position, "blind locating" of interface options (e.g., buttons) can be enhanced by adding various textures to different areas of the plastic overlay or cover and/or a bumpy shape to the edges of recessions of the overlay, for example.

One or more of the components of the systems and/or steps of the methods described above may be implemented alone or in combination in hardware, firmware, and/or as a set of instructions in software, for example. Certain embodiments may be provided as a set of instructions residing on a computer-readable medium, such as a memory, hard disk, DVD, or CD, for execution on a general purpose computer or other processing device. Certain embodiments of the present invention may omit one or more of the method steps and/or perform the steps in a different order than the order listed. For example, some steps may not be performed in certain embodiments of the present invention. As a further example, certain steps may be performed in a different temporal order, including simultaneously, than listed above.

Certain embodiments include computer-readable media for carrying or having computer-executable instructions or data structures stored thereon. Such computer-readable media may be any available media that may be accessed by a general purpose or special purpose computer or other machine with a processor. By way of example, such computer-readable media may comprise RAM, ROM, PROM, EPROM, EEPROM, Flash, CD-ROM or other optical disk storage, magnetic disk storage or other magnetic storage devices, or any other medium which can be used to carry or store desired program code in the form of computer-executable instructions or data structures and which can be accessed by a general purpose or special purpose computer or other machine with a processor. Combinations of the above are also included within the scope of computer-readable media. Computer-executable instructions comprise, for example, instructions and data which cause a general purpose computer, special purpose computer, or special purpose processing machines to perform a certain function or group of functions.

Generally, computer-executable instructions include routines, programs, objects, components, data structures, etc., that perform particular tasks or implement particular abstract data types. Computer-executable instructions, associated data structures, and program modules represent examples of program code for executing steps of certain methods and systems disclosed herein. The particular sequence of such executable instructions or associated data structures represent examples of corresponding acts for implementing the functions described in such steps.

Embodiments of the present invention may be practiced in a networked environment using logical connections to one or more remote computers having processors. Logical connections may include a local area network (LAN) and a wide area network (WAN) that are presented here by way of example and not limitation. Such networking environments are commonplace in office-wide or enterprise-wide computer networks, intranets and the Internet and may use a wide variety of different communication protocols. Those skilled in the art will appreciate that such network computing environments will typically encompass many types of computer system configurations, including personal computers, hand-held devices, multi-processor systems, microprocessor-based or programmable consumer electronics, network PCs, minicomputers, mainframe computers, and the like. Embodiments of the invention may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

An exemplary system for implementing the overall system or portions of embodiments of the invention might include a general purpose computing device in the form of a computer, including a processing unit, a system memory, and a system bus that couples various system components including the system memory to the processing unit. The system memory may include read only memory (ROM) and random access memory (RAM). The computer may also include a magnetic hard disk drive for reading from and writing to a magnetic hard disk, a magnetic disk drive for reading from or writing to a removable magnetic disk, and an optical disk drive for reading from or writing to a removable optical disk such as a CD ROM or other optical media. The drives and their associated computer-readable media provide nonvolatile storage of computer-executable instructions, data structures, program modules and other data for the computer.

While the invention has been described with reference to certain embodiments, it will be understood by those skilled in the art that various changes may be made and equivalents may be substituted without departing from the scope of the invention. In addition, many modifications may be made to adapt a particular situation or material to the teachings of the invention without departing from its scope. Therefore, it is intended that the invention not be limited to the particular embodiment disclosed, but that the invention will include all embodiments falling within the scope of the appended claims.

The invention claimed is:

1. A medical touchscreen interface overlay device comprising:
   a background surface contacting a touchscreen interface, wherein the background surface does not generate a response from the interface when contacted by a user,
   a plurality of touch areas formed in the background surface of the overlay device, the plurality of touch areas having a lesser thickness than the background surface, each of the plurality of touch areas to provide a tactile boundary for a corresponding touchscreen interface function and each of the plurality of touch areas formed in a shape representative of the corresponding touchscreen interface function; and
   an indicator to indicate to the touchscreen interface which overlay device has been placed on the touchscreen interface,
   wherein the overlay device is at least temporarily affixed to the touchscreen interface to facilitate user interaction with the touchscreen interface, wherein the overlay device is associated with an application running on a remote terminal, and wherein configuration of the application on the remote terminal corresponds to the indicator of the overlay device being at least temporarily affixed to the touchscreen interface.

2. The device of claim 1, wherein the plurality of touch areas comprise at least one of a plurality of openings and a plurality of recessed areas comprising a material thickness less than the material thickness of the background surface, wherein the plurality of openings and the plurality of recessed areas allow user contact and interaction with the user interface underlying the overlay.

3. The device of claim 1, wherein the plurality of touch areas comprises at least one of a keystroke areas and a control strip.

4. The device of claim 1, further comprising a plurality of supports to support the overlay device on top of the touchscreen interface.

5. The device of claim 4, wherein the plurality of supports is arranged in a configuration to indicate an overlay device identity to the touchscreen interface.

6. The device of claim 1, wherein the plurality of touch areas correspond to touchscreen interface functions including one or more of directional control, image review, scrolling, zooming, panning, workflow progression, and sliding to at least one of increase and decrease a corresponding parameter value.

7. The device of claim 1, wherein the plurality of touch areas comprise openings in the background surface to expose touch control shapes of the underlying touchscreen interface and wherein the background surface further comprises tactile bumps to facilitate blind location of touch area shapes in the overlay device.

8. The device of claim 1, wherein the plurality of touch areas comprise a combination of openings and at least one of meshes or thin films.

9. The device of claim 1, where the plurality of touch areas comprise at least one recessed area and at least one raised area.

10. The device of claim 1, wherein the device comprises an adhesive strip affixed to a touchscreen interface.

11. The device of claim 1, wherein the indicator comprises a radio frequency identifier to indicate an overlay device identity to the touchscreen interface.

12. The device of claim 1, wherein the touchscreen interface comprises a mobile device touchscreen interface, the mobile device controlling operation of a remote diagnostic imaging workstation, the overlay device associated with an interface program on the mobile device to control the remote diagnostic imaging workstation via a connection between the mobile device and the diagnostic imaging workstation.

13. The device of claim 1, wherein the overlay device comprises a single-use, disposable overlay device.

14. The device of claim 1, wherein the overlay device comprises a reusable, sterilizable overlay device.

15. The device of claim 1, wherein the overlay device is one of a set of template overlay devices used in conjunction with a computer program to facilitate configuration of the touchscreen interface layout to match a selected overlay device.

16. The device of claim 1, wherein the overlay device comprises a universal overlay template provided in conjunction with a tool set to allow a user to customize the overlay template to perform a set of touchscreen interface functions.

17. An article of manufacture comprising:
   an overlay for a clinical device touchscreen interface, said overlay comprising:
      a background surface formed to contact a touchscreen interface;
      an indicator to indicate to the touchscreen interface which overlay device has been placed on the touchscreen interface; and
      a plurality of touch areas formed in the background surface of the overlay device, each of the plurality of touch areas to provide a tactile boundary for a corresponding touchscreen interface function, wherein the plurality of touch areas comprise at least one of a plurality of openings and a plurality of recessed areas comprising a material thickness less than the material thickness of the background surface, wherein the plurality of openings and the plurality of recessed areas allow user contact and interaction with the touchscreen interface underneath the overlay, wherein the overlay is associated with an application running on the clinical device, and wherein configuration of the application on the clinical device corresponds to the overlay device being at least temporarily affixed to the touchscreen interface of the clinical device.

18. The article of manufacture of claim 17, wherein the plurality of touch areas comprise openings in the background surface to expose touch control shapes of the underlying touchscreen interface and wherein the background surface further comprises tactile bumps to facilitate blind location of touch area shapes in the overlay device.

19. The article of manufacture of claim 17, wherein the plurality of touch areas comprise a combination of openings and at least one of meshes or thin films.

20. A touchscreen overlay apparatus comprising:
an adhesive strip overlay for a clinical device touchscreen interface, said overlay comprising:
   a background surface with adhesive backing formed to contact a touchscreen interface;
   an indicator to indicate to the touchscreen interface which overlay device has been placed on the touchscreen interface; and
   a plurality of touch areas formed in the background surface of the overlay device, the plurality of touch areas comprising at least one recessed area and at least one raised area to facilitate selection of functionality available on the clinical device touchscreen interface,
wherein the overlay is associated with an application running on the clinical device, and wherein configuration of the application on the clinical device corresponds to the overlay being at least temporarily affixed to the touchscreen interface of the clinical device.

* * * * *